(12) United States Patent
Gormley (10) Patent No.: US 11,767,806 B1
(45) Date of Patent: Sep. 26, 2023

(54) VARIABLE AREA NOZZLE ASSEMBLY

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/688,261

(22) Filed: Mar. 7, 2022

(51) Int. Cl.
  *F02K 1/30* (2006.01)
  *F02C 9/20* (2006.01)

(52) U.S. Cl.
  CPC .............. *F02K 1/30* (2013.01); *F02C 9/20* (2013.01); *F05D 2220/323* (2013.01)

(58) Field of Classification Search
  CPC ......... F02K 1/30; F02C 9/20; F05D 2220/323
  USPC ........................................................ 415/1
  See application file for complete search history.

(56) References Cited

U.S. PATENT DOCUMENTS

| | | | |
|---|---|---|---|
| 2,880,575 A | 4/1959 | Scialla | |
| 2,989,845 A | 6/1961 | Howald | |
| 4,375,276 A | 3/1983 | Konarski | |
| 4,819,876 A | 4/1989 | Thayer | |
| 4,978,071 A | 12/1990 | Maclean | |
| 5,016,818 A | 5/1991 | Nash | |
| 5,050,803 A | 9/1991 | Wakeman | |
| 7,793,504 B2 | 9/2010 | Baker | |
| 10,371,093 B2 | 8/2019 | Baker | |
| 2007/0256419 A1* | 11/2007 | Baker | F02K 1/16 60/771 |
| 2019/0293022 A1* | 9/2019 | Mickelsen | F02K 1/72 |
| 2021/0131378 A1* | 5/2021 | Colebrooke | F02C 7/00 |
| 2021/0222647 A1* | 7/2021 | Colebrooke | F02K 1/15 |

OTHER PUBLICATIONS

EP search report for EP23160603.9 dated Jul. 12, 2023.

* cited by examiner

*Primary Examiner* — Yi-Kai Wang
(74) *Attorney, Agent, or Firm* — Getz Balich, LLC (57) ABSTRACT

A variable area nozzle assembly for a gas turbine engine includes a fixed structure surrounding an exhaust duct extending along a nozzle centerline. The fixed structure includes an upper side and a lower side opposite the upper side. The variable area nozzle assembly further includes a nozzle disposed about the nozzle centerline. The nozzle includes a nozzle throat cross-sectional area and a nozzle outlet cross-sectional area downstream of the nozzle throat cross-sectional area. The nozzle includes an upper panel and a lower panel. The upper panel includes an upper downstream end and the lower panel including a lower downstream end. The upper downstream end and the lower downstream end define a portion of the nozzle throat cross-sectional area. The variable area nozzle assembly further includes a nozzle actuation system including an upper shaft connected to the upper panel and a lower shaft connected to the lower panel.

18 Claims, 7 Drawing Sheets

VARIABLE AREA NOZZLE ASSEMBLY

BACKGROUND

1. Technical Field

This disclosure relates generally to aircraft gas turbine engines, and more particularly to variable area nozzle assemblies for gas turbine engines.

2. Background Information

Turbojet engines for aircraft may frequently include variable area exhaust nozzles to accommodate subsonic, transonic, and supersonic speeds. Due to the different properties of exhaust gases as they flow through the nozzle at different speeds, there may be a need to vary the area of the nozzle at one or more locations within the nozzle in order to ensure proper and efficient turbojet operation over a range of aircraft flight conditions. What is needed are variable area nozzle assemblies which improve upon variable area nozzle assemblies conventionally known in the art.

SUMMARY

It should be understood that any or all of the features or embodiments described herein can be used or combined in any combination with each and every other feature or embodiment described herein unless expressly noted otherwise.

According to an aspect of the present disclosure, a variable area nozzle assembly for a gas turbine engine includes a fixed structure surrounding an exhaust duct extending along a nozzle centerline. The fixed structure defines an exhaust duct outlet of the exhaust duct. The fixed structure includes an upper side and a lower side opposite the upper side. The fixed structure further includes a first lateral side and a second lateral side opposite the first lateral side. The variable area nozzle assembly further includes a nozzle disposed about the nozzle centerline. The nozzle includes a nozzle throat cross-sectional area and a nozzle outlet cross-sectional area downstream of the nozzle throat cross-sectional area. The nozzle includes an upper panel pivotably mounted to the fixed structure at the upper side and a lower panel pivotably mounted to the fixed structure at the lower side. The upper panel includes an upper downstream end and the lower panel including a lower downstream end. The upper downstream end and the lower downstream end define a portion of the nozzle throat cross-sectional area. The variable area nozzle assembly further includes a nozzle actuation system including an upper shaft connected to the upper panel and a lower shaft connected lower panel. Rotation of the upper shaft and the lower shaft is configured to control a cross-sectional area of the throat cross-sectional area by pivoting the upper panel and the lower panel, respectively, relative to the fixed structure.

In any of the aspects or embodiments described above and herein, the nozzle throat cross-sectional area may have a rectangular cross-sectional shape.

In any of the aspects or embodiments described above and herein, the upper shaft may be positioned radially outside of the upper panel with respect to the nozzle centerline and the lower shaft may be positioned radially outside of the lower panel with respect to the nozzle centerline.

In any of the aspects or embodiments described above and herein, the nozzle actuation system may include an upper cam fixedly mounted to the upper shaft and the upper panel may include an extension member connected to the upper cam.

In any of the aspects or embodiments described above and herein, the nozzle actuation system may include an actuation linkage pivotably mounted to the upper cam and the extension member.

In any of the aspects or embodiments described above and herein, the extension member may be curved.

In any of the aspects or embodiments described above and herein, the upper shaft may extend between a first lateral end and a second lateral end and the nozzle actuation system may include a motor coupled to one of the first lateral end or the second lateral end and configured to rotate the upper shaft.

In any of the aspects or embodiments described above and herein, the nozzle may further include an upper panel assembly and a lower panel assembly. The upper panel assembly may include a first inner panel pivotably mounted to the upper panel at the upper downstream end. The lower panel assembly may include a second inner panel pivotably mounted to the lower panel at the lower downstream end.

In any of the aspects or embodiments described above and herein, the upper panel assembly may include a first outer panel pivotably mounted to the first inner panel and the lower panel assembly may include a second outer panel pivotably mounted to the second inner panel.

In any of the aspects or embodiments described above and herein, the upper panel assembly may include at least one linkage pivotably connected to the first outer panel and the first inner panel.

In any of the aspects or embodiments described above and herein, the first inner panel may include a first axial end and a second axial end. The at least one linkage may be positioned axially between the first axial end and the second axial end with respect to the nozzle centerline.

In any of the aspects or embodiments described above and herein, the first outer panel may be positioned proximate the first inner panel at a downstream end of the upper panel assembly and the first outer panel may be configured to pivot relative to the first inner panel proximate the downstream end.

In any of the aspects or embodiments described above and herein, the upper panel assembly may include a seal positioned at the downstream end between the first inner panel and the first outer panel.

In any of the aspects or embodiments described above and herein, the downstream end of the upper panel assembly may define a portion of the nozzle outlet cross-sectional area.

According to another aspect of the present disclosure, a method for operating a variable area nozzle assembly includes providing a fixed structure surrounding an exhaust duct extending along a nozzle centerline. The method further includes pivoting an upper panel and a lower panel of a nozzle with a nozzle actuation system to control a cross-sectional area of a throat-cross-sectional area of the nozzle. The upper panel and the lower panel are pivotably mounted to the fixed structure. Pivoting the upper panel includes rotating an upper shaft connected to the upper panel and pivoting the lower panel includes rotating a lower shaft connected to the lower panel.

In any of the aspects or embodiments described above and herein, the upper shaft may be positioned radially outside of the upper panel with respect to the nozzle centerline and the lower shaft may be positioned radially outside of the lower panel with respect to the nozzle centerline.

In any of the aspects or embodiments described above and herein, the nozzle actuation system may include an upper cam fixedly mounted to the upper shaft and the upper panel may include an extension member connected to the upper cam.

In any of the aspects or embodiments described above and herein, the nozzle actuation system may include an actuation linkage pivotably mounted to the upper cam and the extension member.

In any of the aspects or embodiments described above and herein, the upper shaft may extend between a first lateral end and a second lateral end. The method may further include rotating the upper shaft with a motor coupled to one of the first lateral end or the second lateral end.

According to another aspect of the present disclosure, a variable area nozzle assembly for a gas turbine engine includes a fixed structure surrounding an exhaust duct extending along a nozzle centerline. The fixed structure defines an exhaust duct outlet of the exhaust duct. The fixed structure includes an upper side and a lower side opposite the upper side. The fixed structure further includes a first lateral side and a second lateral side opposite the first lateral side. The variable area nozzle assembly further includes a nozzle disposed about the nozzle centerline. The nozzle includes a nozzle throat cross-sectional area and a nozzle outlet cross-sectional area downstream of the nozzle throat cross-sectional area. The nozzle includes an upper panel pivotably mounted to the fixed structure at the upper side and a lower panel pivotably mounted to the fixed structure at the lower side. The upper panel includes an upper downstream end and the lower panel includes a lower downstream end. The nozzle further includes an upper panel assembly and a lower panel assembly. The upper panel assembly includes a first inner panel pivotably mounted to the upper panel at the upper downstream end. The lower panel assembly includes a second inner panel pivotably mounted to the lower panel at the lower downstream end. The upper panel assembly and the lower panel assembly define a portion of the nozzle outlet cross-sectional area. The variable area nozzle assembly further includes a nozzle actuation system including an upper shaft connected to the upper panel and a lower shaft connected lower panel such that rotation of the upper shaft and the lower shaft is configured to control a cross-sectional area of the throat cross-sectional area by pivoting the upper panel and the lower panel, respectively, relative to the fixed structure.

The present disclosure, and all its aspects, embodiments and advantages associated therewith will become more readily apparent in view of the detailed description provided below, including the accompanying drawings.

DETAILED DESCRIPTION

Figure 1:
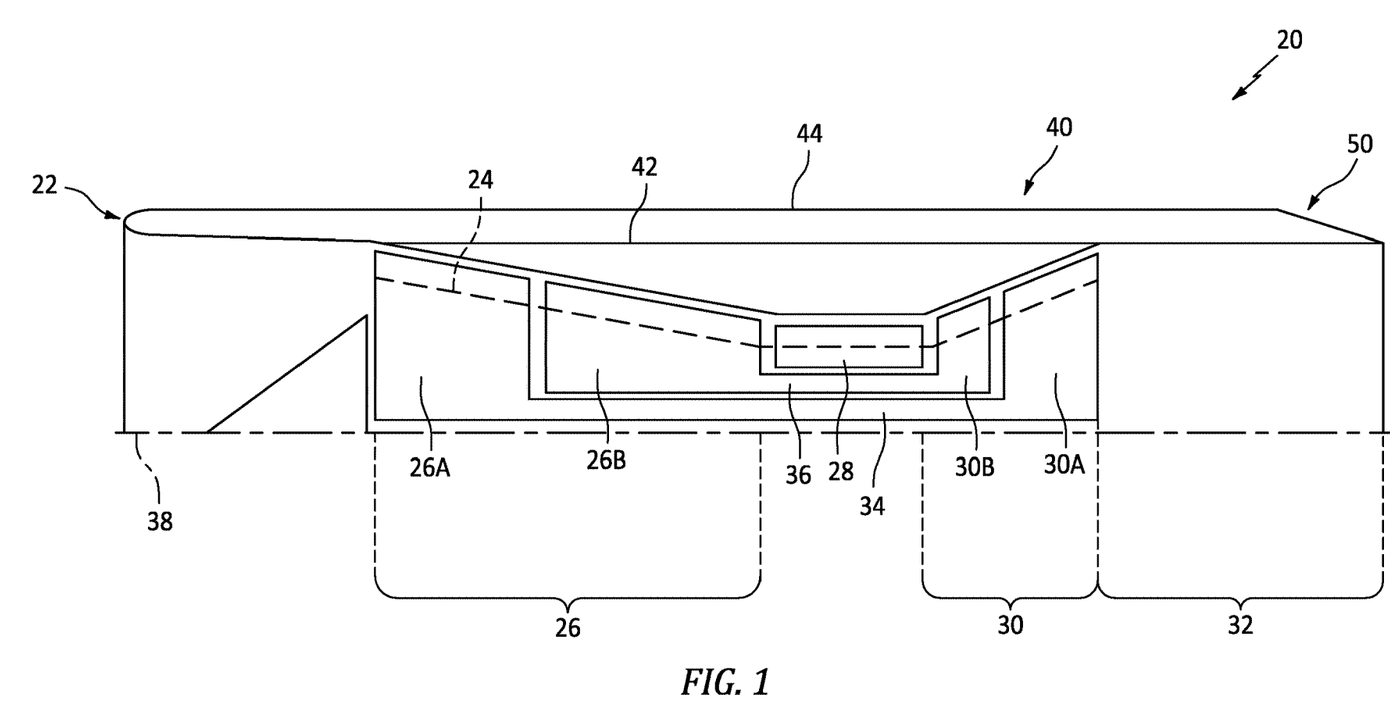
FIG. 1 illustrates a side cutaway view of a gas turbine engine, in accordance with one or more embodiments of the present disclosure.

Referring to FIG. 1, an exemplary gas turbine engine 20 capable of using aspects of the present disclosure is schematically illustrated. Although depicted as a turbojet gas turbine engine in the disclosed non-limiting embodiments, it should be understood that the concepts described herein are not limited to use with turbojets and may be applicable to other configurations of aircraft gas turbine engines as well including, but not limited to turboprop and turbofan gas turbine engines.

The gas turbine engine 20 generally includes an inlet structure 22 through which ambient air is directed into a core flow path 24 of the gas turbine engine 20. The air within the core flow path 24 may be referred to as "core air." The gas turbine engine 20 includes a compressor section 26, for compressing the core air, and a combustor 28 wherein the compressed core air is mixed with fuel and ignited for generating combustion gases. The gas turbine engine 20 further includes a turbine section 30 for extracting energy from the combustion gases. The resultant combustion gases from the combustor 28 are expanded over the turbine section 30 and then exhausted via an exhaust section 32, thereby providing thrust.

The compressor section 26 of the gas turbine engine 20 may include a low-pressure compressor 26A located upstream of a high-pressure compressor 26B. The turbine section 30 may include a high-pressure turbine 30B located upstream of a low-pressure turbine 30A. In one embodiment, the low-pressure compressor 26A may be connected to the low-pressure turbine 30A by a low-pressure shaft 34 and the high-pressure compressor 26B may be connected to the high-pressure turbine 30B by a high-pressure shaft 36. The compressors 26A, 26B, the combustor 28, and the turbines 30A, 30B may typically be concentric about a common axial centerline 38 (e.g., a rotational axis) of the gas turbine engine 20.

The compressor section 26, combustor 28, and turbine section 30 are arranged sequentially along the axial centerline 38 within an engine housing 40. This engine housing 40 includes an engine case 42 and a nacelle 44. The engine case 42 houses one or more of the compressor section 26, combustor 28, and turbine section 30, which may be collectively referred to as an "engine core." The nacelle 44 houses and provides an aerodynamic cover for the engine case 42. The engine housing 40 of FIG. 1 may also form the inlet structure 22 and at least a portion of a variable area nozzle assembly 46 for the exhaust section 32 of the gas turbine engine 20.

Figure 2:
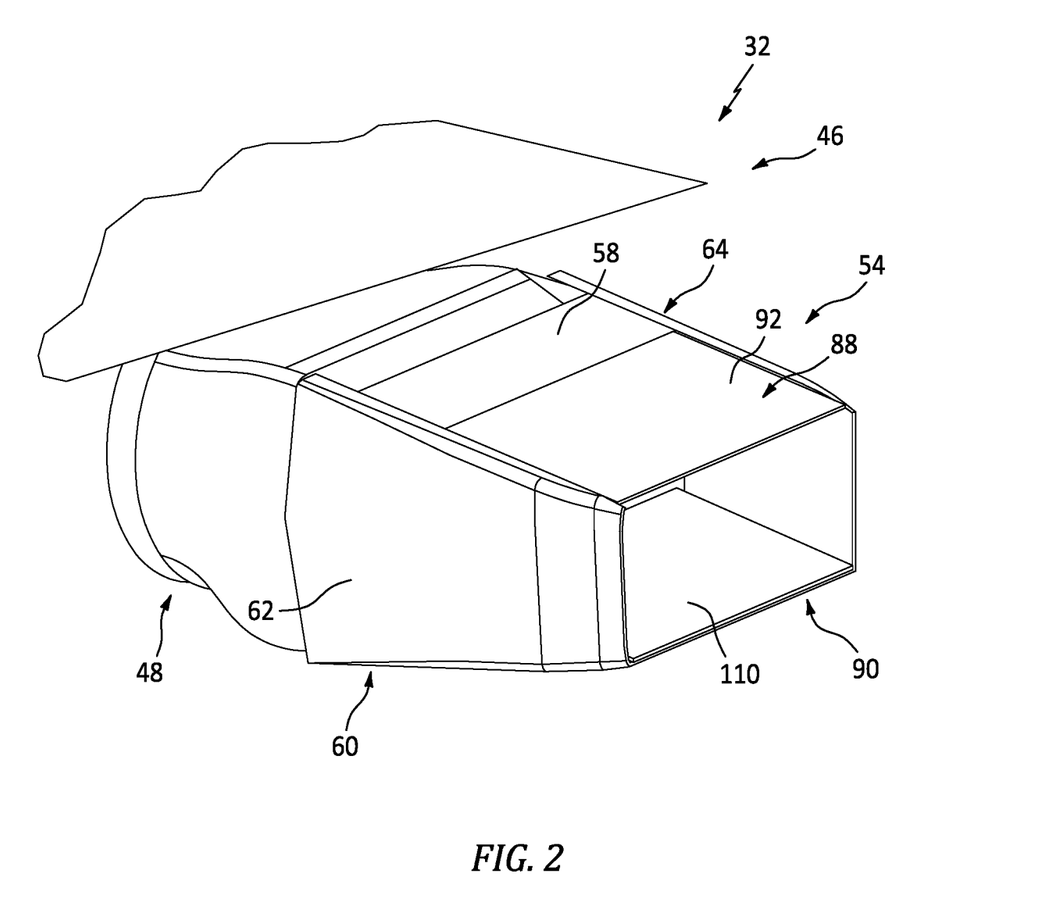
FIG. 2 illustrates a perspective view of a variable area nozzle assembly, in accordance with one or more embodiments of the present disclosure.
Figure 3:
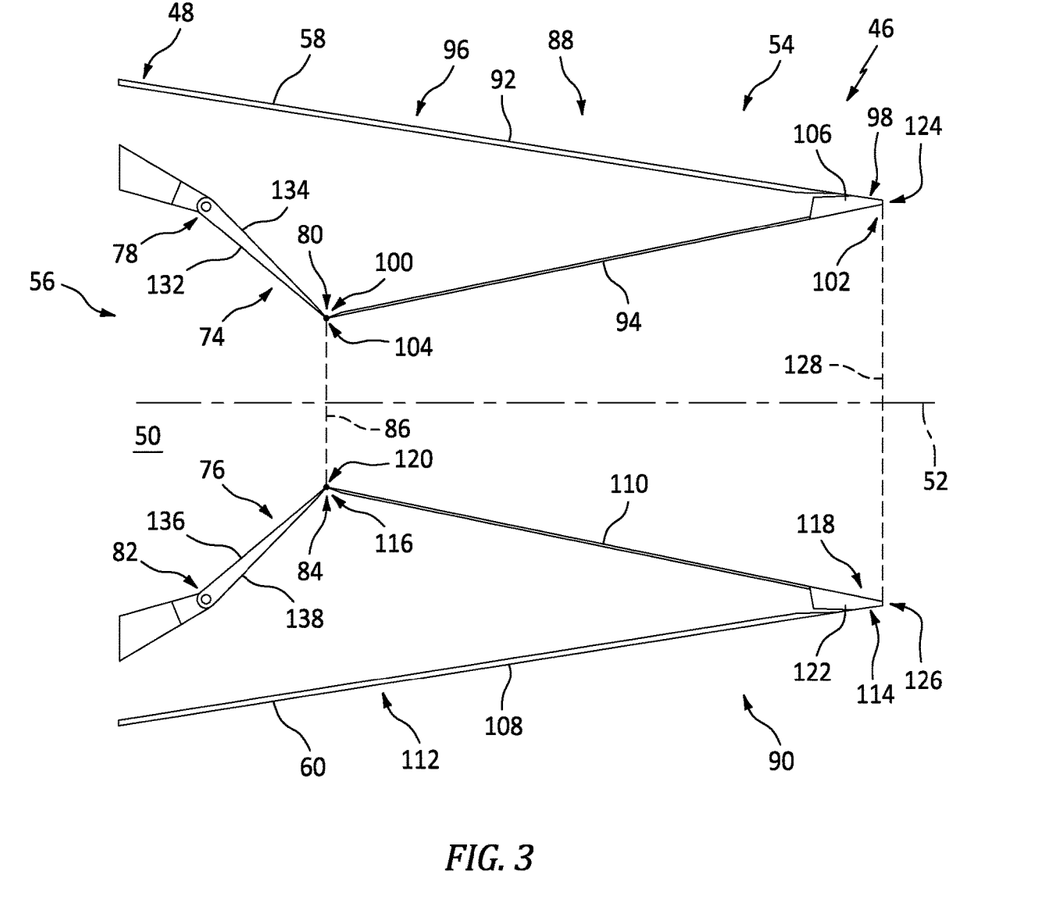
FIG. 3 illustrates a side sectional view of the variable area nozzle assembly of FIG. 2, in accordance with one or more embodiments of the present disclosure.
Figure 4:
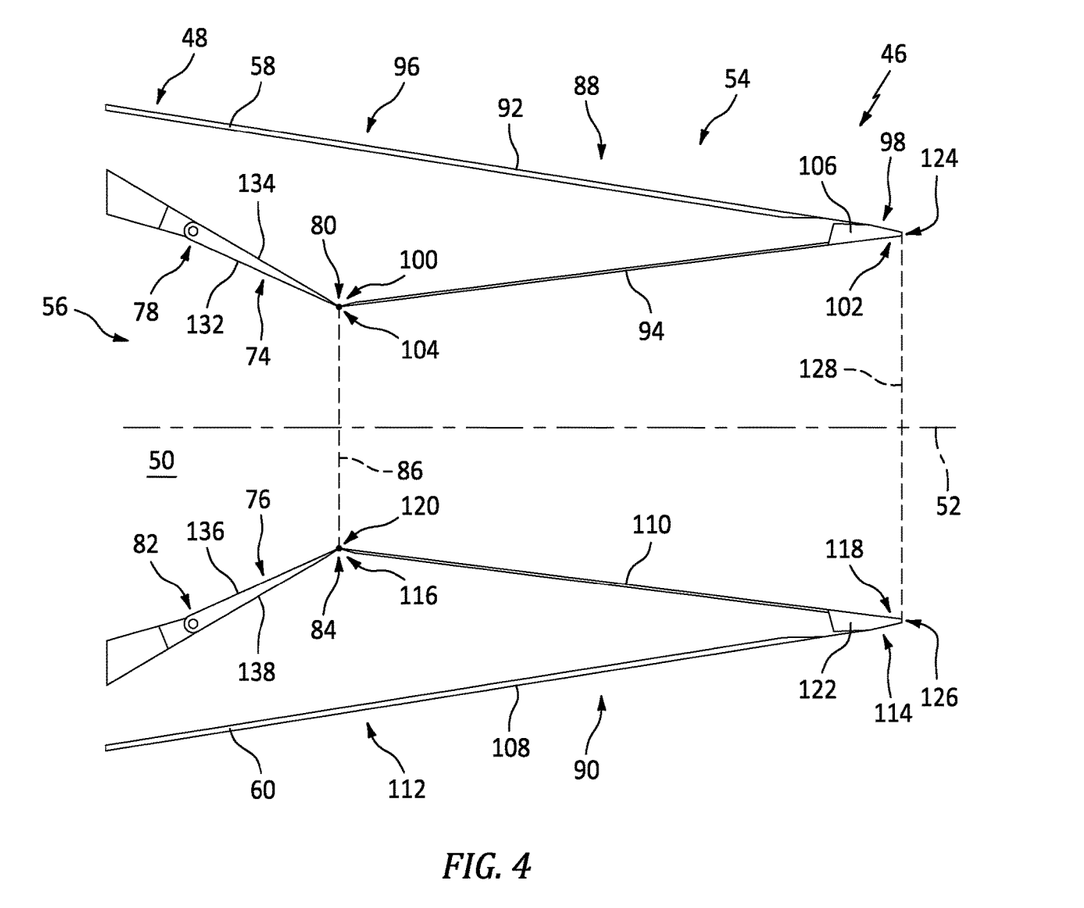
FIG. 4 illustrates a side sectional view of the variable area nozzle assembly of FIG. 2, in accordance with one or more embodiments of the present disclosure.

Referring to FIGS. 2-4, aspects of the present disclosure include a variable area nozzle assembly 46 for the exhaust section 32 (see FIG. 1). The variable area nozzle assembly 46 generally includes a fixed structure 48 of the gas turbine engine 20 which may be configured as or otherwise include, for example, the engine case 42, the nacelle 44, or another suitable fixed structure of the gas turbine engine 20. The fixed structure 48 surrounds an exhaust duct 50 generally extending along a nozzle centerline 52, which nozzle centerline 52 may or may not be colinear with the axial centerline 38 of the gas turbine engine 20 (see FIG. 1). The exhaust duct 50 is configured to direct exhaust gases along at least a portion of the core flow path 24 from the turbine section 30 to a variable area nozzle 54 mounted to the fixed structure 48 and located at a downstream end of the exhaust section 32. In some embodiments, the exhaust duct 50 may additionally be configured to direct gases from a bypass flowpath to the nozzle 54.

The fixed structure 48 defines an exhaust duct outlet 56 of the exhaust duct 50 at a downstream end of the exhaust duct 50. The fixed structure 48 includes an upper side 58 and a lower side 60 opposite the upper side 58. The fixed structure 48 further includes a first lateral side 62 and a second lateral side 64 opposite the first lateral side 62. Each of the first lateral side 62 and the second lateral side 64 extend between the upper side 58 and the lower side 60. The exhaust duct outlet 56 is defined between the upper side 58, the lower side 60, the first lateral side 62, and the second lateral side 64. It should be understood that relative positional terms, such as "forward," "aft," "upper," "lower," "above," "below," "upstream," downstream," "lateral," "vertical," and the like are relative to the normal operational attitude of the gas turbine engine 20 and should not be considered otherwise limiting.

The nozzle 54 may include a series of movable panels configured to control a cross-sectional exhaust area of the nozzle 54 at one or more axial positions relative to the nozzle centerline 52. As shown, for example, in FIGS. 3 and 4, the nozzle 54 may be configured as a convergent-divergent nozzle. However, the present disclosure is not limited to this particular nozzle configuration and aspects of the present disclosure may be applicable to other configurations of variable area nozzles as well. The nozzle 54 of FIGS. 4 and 5 includes an upstream A8 axial portion which may be a converging portion of the nozzle 54. The nozzle 54 of FIGS. 4 and 5 further includes a downstream A9 axial portion which may be a diverging portion of the nozzle 54.

The nozzle 54 includes an upper A8 panel 74 and a lower A8 panel 76 which define the upstream A8 axial portion therebetween. The upper A8 panel 74 includes an upstream end 78 and a downstream end 80 opposite the upstream end 78. The upper A8 panel 74 further includes an inner side 132 and an outer side 134 opposite the inner side 132. Similarly, the lower A8 panel 76 includes an upstream end 82 and a downstream end 84 opposite the upstream end 82. The lower A8 panel 76 further includes an inner side 136 and an outer side 138 opposite the inner side 136. The downstream end 80 of the upper A8 panel 74 and the downstream end 84 of the lower A8 panel 76 define a throat cross-sectional area 86 of the nozzle 54 therebetween. The upper A8 panel 74 is pivotably mounted to the fixed structure 48 at the upstream end 78 and the lower A8 panel 76 is pivotably mounted to the fixed structure 48 at the upstream end 82. The upper A8 panel 74 and the lower A8 panel 76 are be configured to pivot relative to the fixed structure 48 to vary a cross-sectional area of the throat cross-sectional area 86.

As shown in FIG. 3, for example, the upper A8 panel 74 and the lower A8 panel 76 may be positioned in a radially innermost position to define a minimum area of the throat cross-sectional area 86 (e.g., a minimum A8 position). As shown in FIG. 4, for example, the upper A8 panel 74 and the lower A8 panel 76 may be positioned in a radially outermost position to define a maximum area of the throat cross-sectional area 86 (e.g., a maximum A8 position). Accordingly, the upper A8 panel 74 and the lower A8 panel 76 may be configured to pivot between the minimum A8 position, the maximum A8 position, and a plurality of intermediate A8 positions, relative to the fixed structure 48 to vary a cross-sectional area of the throat cross-sectional area 86, as necessary for operation of the gas turbine engine 20.

The nozzle 54 includes an upper A9 panel assembly 88 and a lower A9 panel assembly 90. The upper A9 panel assembly 88 includes an outer panel 92 and an inner panel 94 which is moveable relative to the outer panel 92. The outer panel 92 may define an exterior portion of the nozzle 54. The outer panel 92 extends between a first axial end 96 and a second axial end 98 opposite the first axial end 96. The first axial end 96 of the outer panel 92 is mounted to the fixed structure 48. The inner panel 94 defines an inner flowpath surface for the exhaust gases passing through the nozzle 54. The inner panel 94 extends between a first axial end 100 and a second axial end 102 opposite the first axial end 100. The first axial end 100 of the inner panel 94 is pivotably mounted to the downstream end 80 of the upper A8 panel 74 along a hinge line 104. The second axial end 98 of the outer panel 92 is positioned proximate the second axial end 102 of the inner panel 94. The inner panel 94 is configured to pivot relative to the outer panel 92 at or proximate the second axial end 102. The interface between the second axial end 98 of the outer panel 92 and the second axial end 102 of the inner panel 94 may include a seal 106 to accommodate relative movement between the outer panel 92 and the inner panel 94. In some embodiments, the seal 106 may be configured, for example, as a blade seal, however, the present disclosure is not limited to this particular configuration of the seal 106. The second axial end 98 of the outer panel 92, the second axial end 102 of the inner panel 94, and the seal 106 define a downstream end 124 of the upper A9 panel assembly 88.

The lower A9 panel assembly 90 includes an outer panel 108 and an inner panel 110 which is moveable relative to the outer panel 108. The outer panel 108 may define an exterior portion of the nozzle 54. The outer panel 108 extends between a first axial end 112 and a second axial end 114 opposite the first axial end 112. The first axial end 112 of the outer panel 108 is mounted to the fixed structure 48. The inner panel 110 defines an inner flowpath surface for the exhaust gases passing through the nozzle 54. The inner panel 110 extends between a first axial end 116 and a second axial end 118 opposite the first axial end 116. The first axial end 116 of the inner panel 110 is pivotably mounted to the downstream end 84 of the lower A8 panel 76 along a hinge line 120. The second axial end 114 of the outer panel 108 is positioned proximate the second axial end 118 of the inner panel 110. The inner panel 110 is configured to pivot relative to the outer panel 108 at or proximate the second axial end 118. The interface between the second axial end 114 of the outer panel 108 and the second axial end 118 of the inner panel 110 may include a seal 122 to accommodate relative movement between the outer panel 108 and the inner panel 110. In some embodiments, the seal 122 may be configured, for example, as a blade seal, however, the present disclosure is not limited to this particular configuration of the seal 122. The second axial end 114 of the outer panel 108, the second axial end 118 of the inner panel 110, and the seal 122 define a downstream end 126 of the lower A9 panel assembly 90.

The downstream end 124 of the upper A9 panel assembly 88 and the downstream end 126 of the lower A9 panel assembly 90 define an outlet cross-sectional area 128 of the nozzle 54 therebetween. As shown in FIGS. 3 and 4, the outer panel 92 of the upper A9 panel assembly 88 and the outer panel 108 of the lower A9 panel assembly 90 may be substantially fixed relative to the fixed structure 48. Accordingly, the outlet cross-sectional area 128 of the nozzle 54 of FIGS. 3 and 4 may be substantially fixed. It should be understood, however, that the present disclosure is not limited to variable area nozzles having a fixed outlet cross-sectional area (e.g., a fixed A9) and aspects of the present disclosure are applicable to variable area nozzles configured to vary the outlet cross-sectional area as well. The outlet cross-sectional area 128, as well as other portions of the nozzle 54 including, but not limited to the exhaust duct outlet 56, the throat cross-sectional area 86, etc., may have a rectangular or substantially rectangular cross-sectional shape. For example, the outlet cross-sectional area 128, throat cross-sectional area 86, the exhaust duct outlet 56, etc. may be bounded, at least in part, by two substantially parallel lateral sides and two substantially parallel vertical sides. However, the present disclosure is not limited in application to only nozzles having rectangular or substantially rectangular cross-sectional shapes. As used herein, the term "substantially" with respect to a direction or angle refers to the stated direction or angle +/- five degrees.

Figure 5:
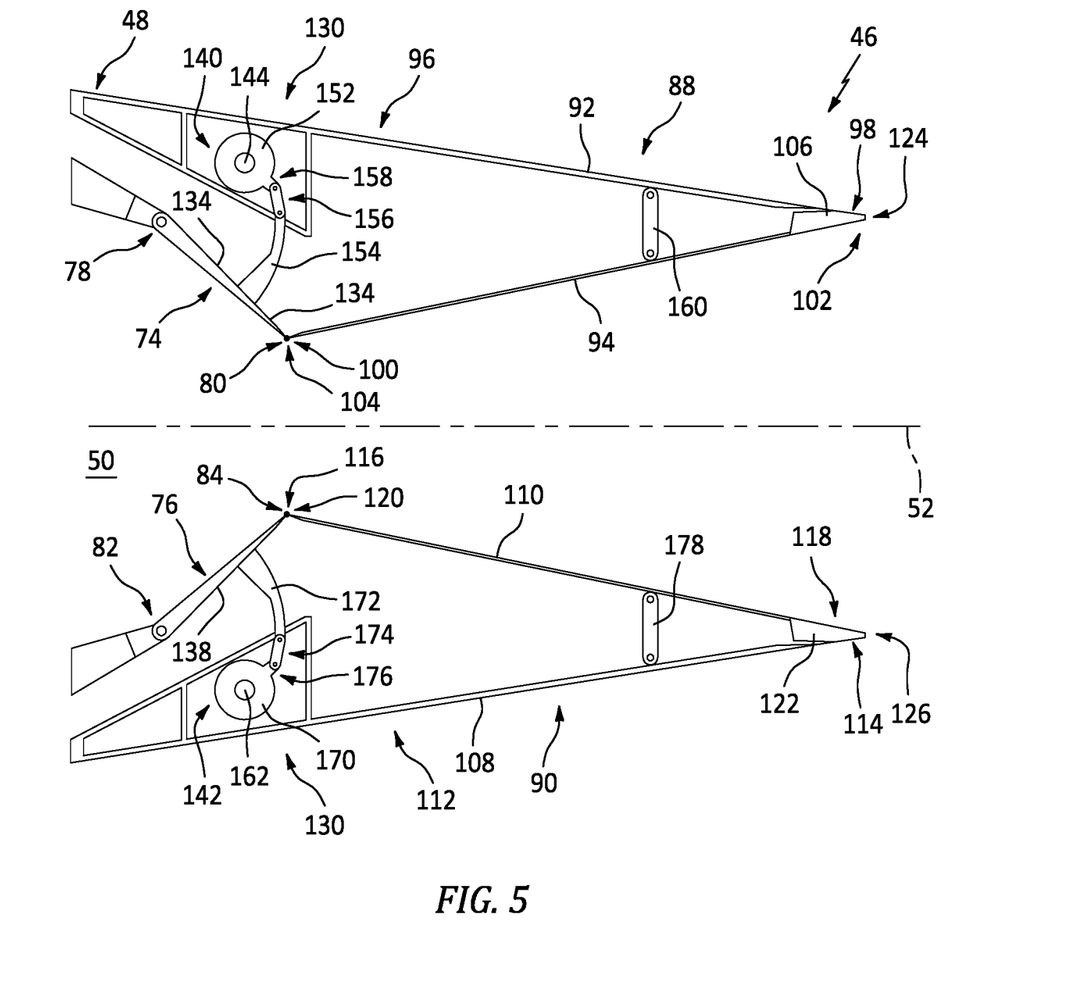
FIG. 5 illustrates a side sectional view of the variable area nozzle assembly of FIG. 2, in accordance with one or more embodiments of the present disclosure.
Figure 6:
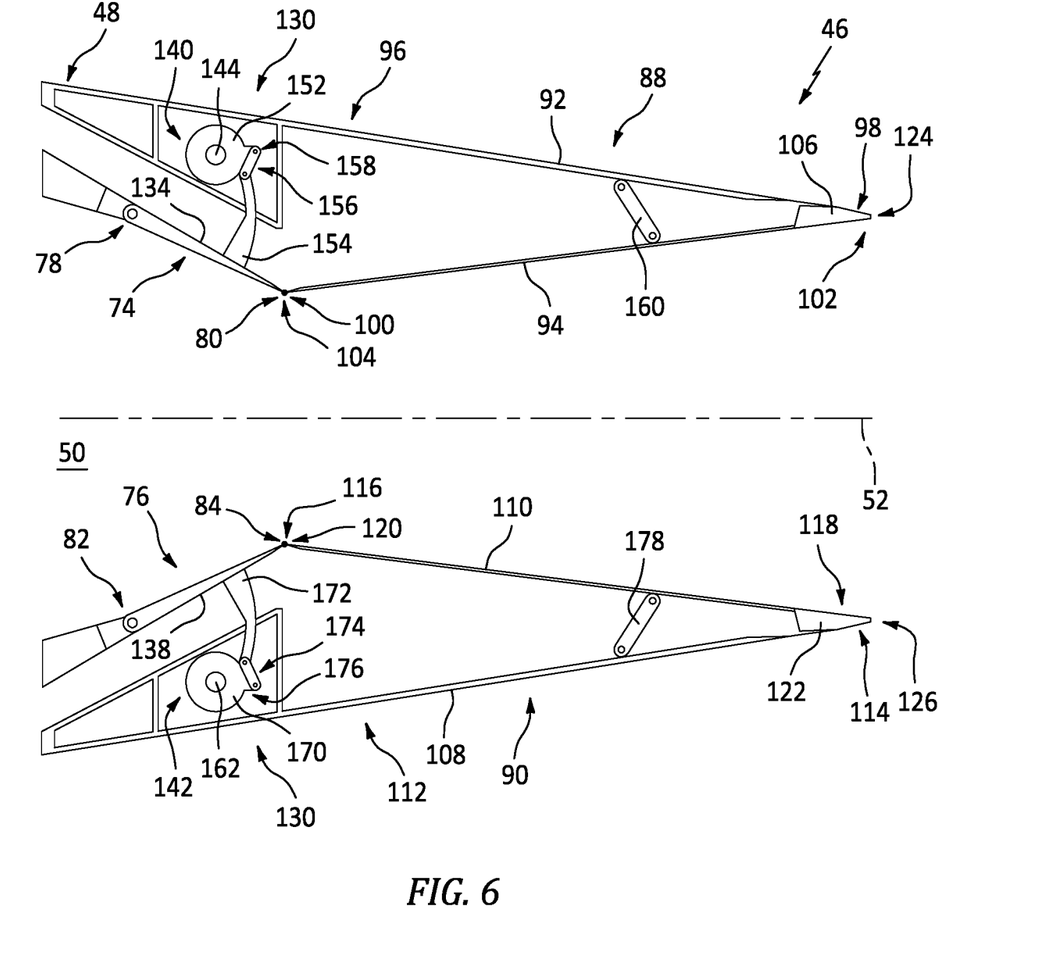
FIG. 6 illustrates a side sectional view of the variable area nozzle assembly of FIG. 2, in accordance with one or more embodiments of the present disclosure.
Figure 7:
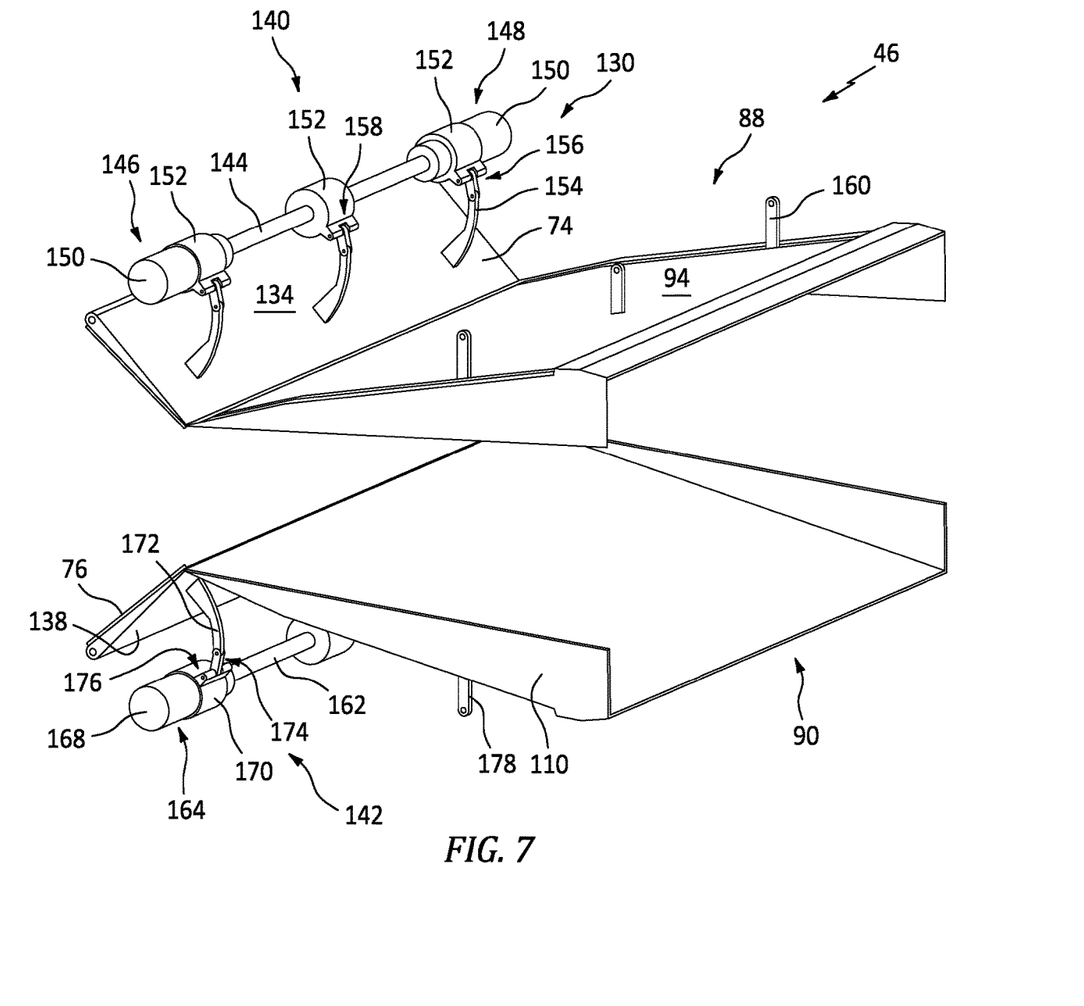
FIG. 7 illustrates a perspective view of a portion of the variable area nozzle assembly of FIG. 2, in accordance with one or more embodiments of the present disclosure.

Referring to FIGS. 5-7, the variable area nozzle assembly 46 includes a nozzle actuation system 130 configured to effect pivoting of the upper A8 panel 74 and the lower A8 panel 76. The nozzle actuation system 130 includes an upper rotary actuation system 140 and a lower rotary actuation system 142. The upper rotary actuation system 140 is configured to effect pivoting of the upper A8 panel 74 relative to the fixed structure 48. The lower rotary actuation system 142 is configured to effect pivoting of the lower A8 panel 76 relative to the fixed structure 48.

The upper rotary actuation system 140 includes a shaft 144 positioned radially outside the upper A8 panel 74 with respect to the nozzle centerline 52. The shaft 144 extends between a first lateral end 146 and a second lateral end 148 opposite the first lateral end 146. The upper rotary actuation system 140 includes at least one motor 150 configured to effect rotation of the shaft 144. The upper rotary actuation system 140 of FIG. 7 includes one of the motor 150 coupled to the first lateral end 146 of the shaft 144 and another one of the motor 150 coupled to the second lateral end 148 of the shaft 144. In some embodiments, however, the upper rotary actuation system 140 may include a single motor 150 coupled to the shaft 144. The motor 150 may be configured, for example, as an electric motor or any other suitable rotational actuation device and the present disclosure is not limited to any particular configuration of the motor 150. The shaft 144 and associated at least one motor 150 may be mounted to and/or within the fixed structure 48.

The upper rotary actuation system 140 includes at least one cam 152 fixedly mounted to the shaft 144. The upper rotary actuation system 140 of FIG. 7 includes three cams 152, however, the present disclosure is not limited to any particular number of cams 152. The cam 152 may have a generally cylindrical shape. In some embodiments, the cam 152 may have an eccentric shape about a rotational axis of the cam 152. In some embodiments, the cam 152 may include an extension portion 158 which extends outward in a direction away from the shaft 144. In some embodiments, the cam 152 may be directly driven by the shaft 144 which, in turn, may be directly driven by the motor 150 (e.g., 1:1 rotation between the cam 152 and the motor 150). In some other embodiments, the upper rotary actuation system 140 may include gearing such that the cam 152 may rotate faster or slower than the shaft 144 and/or the motor 150. The upper rotary actuation system 140 further includes at least one extension member 154 extending from the outer side 134 of the upper A8 panel 74. Each extension member 154 connects the upper A8 panel 74 to a respective cam 152. In some embodiments, the extension member 154 may have a curved configuration. For example, the extension member 154 may be curved such that the extension member 154 has a concave side which faces the upstream end 78 of the upper A8 panel 74 and a convex side which faces the downstream end 80 of the upper A8 panel 74. In some embodiments, the extension member 154 may be connected to the respective cam 152 by an actuation linkage 156. The actuation linkage 156 may be pivotably mounted to one or both of the cam 152 (e.g., extension portion 158 of the cam 152) and the extension member 154.

As shown in FIGS. 5 and 6, rotation of the shaft 144 by the motor 150 effects pivoting of the upper A8 panel 74. FIG. 5 shows the upper A8 panel 74 in a minimum A8 position. Rotation of the cam 152 (e.g., in a counterclockwise direction) may cause the upper A8 panel 74 to pivot toward the maximum A8 position shown in FIG. 6. Similarly, rotation of the cam 152 in an opposite direction (e.g., in a clockwise direction) may cause the upper A8 panel 74 to pivot toward the minimum A8 position shown in FIG. 5. As previously discussed, the first axial end 100 of the inner panel 94 is pivotably mounted to the downstream end 80 of the upper A8 panel 74 along the hinge line 104. Accordingly, actuation of the upper A8 panel 74 by the upper rotary actuation system 140 will also cause the inner panel 94 to pivot and translate (e.g., relative to the downstream end 124), as shown in FIGS. 5 and 6.

In some embodiments, the upper rotary actuation system 140 may further include at least one A9 linkage 160. The upper rotary actuation system 140 of FIG. 7 includes three A9 linkages 160, however, the present disclosure is not limited to any particular number of A9 linkages 160. The A9 linkage 160 is positioned between and connected to the outer panel 92 and the inner panel 94 of the upper A9 panel assembly 88. The A9 linkage 160 is positioned axially between the first axial ends 96, 100 and second axial ends 98, 102 of the respective outer panel 92 and inner panel 94. The A9 linkage 160 may be pivotably connected to one or both of the outer panel 92 and the inner panel 94. Accordingly, the A9 linkage 160 may pivot relative to the outer panel 92 and the inner panel 94 as the inner panel 94 pivots relative to the outer panel 92. The A9 linkage 160 provides support to the inner panel 94, thereby reducing vertical movement of the second axial end 102 of the inner panel 94 relative to the outer panel 92. Accordingly, the support provided by the A9 linkage 160 may improve the sealing function of the seal 106 and allow simplified embodiments of the seal 106 to be implemented.

The lower rotary actuation system 142 may have a similar configuration as the upper rotary actuation system 140. Accordingly, for the sake of brevity, some description of the configuration and operation of the lower rotary system 142 is omitted. The lower rotary actuation system 142 includes a shaft 162 positioned radially outside the lower A8 panel 76 with respect to the nozzle centerline 52. The shaft 162 extends between a first lateral end 164 and a second lateral end (not shown) opposite the first lateral end 164. The lower rotary actuation system 142 includes at least one motor 168 configured to effect rotation of the shaft 162. The shaft 162 and associated at least one motor 168 may be mounted to and/or within the fixed structure 48.

The lower rotary actuation system 142 includes at least one cam 170 fixedly mounted to the shaft 162. The cam 170 may have a generally cylindrical shape. In some embodiments, the cam 170 may have an eccentric shape about a rotational axis of the cam 170. In some embodiments, the cam 170 may include an extension portion 176 which extends outward in a direction away from the shaft 162. The lower rotary actuation system 142 further includes at least one extension member 172 extending from the outer side 138 of the lower A8 panel 76. Each extension member 172 connects the lower A8 panel 76 to a respective cam 170. In some embodiments, the extension member 172 may have a curved configuration. For example, the extension member 172 may be curved such that the extension member 172 has a concave side which faces the upstream end 82 of the lower A8 panel 76 and a convex side which faces the downstream end 84 of the lower A8 panel 76. In some embodiments, the extension member 172 may be connected to the respective cam 170 by an actuation linkage 174. The actuation linkage 174 may be pivotably mounted to one or both of the cam 170 (e.g., extension portion 176 of the cam 170) and the extension member 172.

As shown in FIGS. 5 and 6, rotation of the shaft 162 by the motor 168 effects pivoting of the lower A8 panel 76. As previously discussed, the first axial end 116 of the inner panel 110 is pivotably mounted to the downstream end 84 of the lower A8 panel 76 along the hinge line 120. Accordingly, actuation of the lower A8 panel 76 by the lower rotary actuation system 142 will also cause the inner panel 110 to pivot and translate (e.g., relative to the downstream end 126), as shown in FIGS. 5 and 6.

In some embodiments, the lower rotary actuation system 142 may further include at least one A9 linkage 178. The A9 linkage 178 is positioned between and connected to the outer panel 108 and the inner panel 110 of the lower A9 panel assembly 90. The A9 linkage 178 is positioned axially between the first axial ends 112, 116 and second axial ends 114, 118 of the respective outer panel 108 and inner panel 110. The A9 linkage 178 may be pivotably connected to one or both of the outer panel 108 and the inner panel 110. Accordingly, the A9 linkage 178 may pivot relative to the outer panel 108 and the inner panel 110 as the inner panel 110 pivots relative to the outer panel 108. The A9 linkage 178 provides support to the inner panel 110, thereby reducing vertical movement of the second axial end 118 of the inner panel 110 relative to the outer panel 108. Accordingly, the support provided by the A9 linkage 178 may improve the sealing function of the seal 122 and allow simplified embodiments of the seal 122 to be implemented.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A variable area nozzle assembly for a gas turbine engine, comprises:
    a fixed structure surrounding an exhaust duct extending along a nozzle centerline, the fixed structure defining an exhaust duct outlet of the exhaust duct, the fixed structure including an upper side and a lower side opposite the upper side, the fixed structure further including a first lateral side and a second lateral side opposite the first lateral side;
    a nozzle disposed about the nozzle centerline, the nozzle including a nozzle throat cross-sectional area and a nozzle outlet cross-sectional area downstream of the nozzle throat cross-sectional area, the nozzle including an upper panel pivotably mounted to the fixed structure at the upper side and a lower panel pivotably mounted to the fixed structure at the lower side, the upper panel including an upper downstream end and the lower panel including a lower downstream end, the upper downstream end and the lower downstream end defining a portion of the nozzle throat cross-sectional area; and
    a nozzle actuation system including an upper rotatable shaft connected to the upper panel and a lower rotatable shaft connected lower panel such that rotation of the upper rotatable shaft and the lower rotatable shaft is configured to control a cross-sectional area of the throat cross-sectional area by pivoting the upper panel and the lower panel, respectively, relative to the fixed structure, each of the upper rotatable shaft and the lower rotatable shaft extending laterally between and to a first lateral end and a second lateral end, the upper rotatable shaft positioned radially outside of and spaced from the upper panel with respect to the nozzle centerline and the lower rotatable shaft positioned radially outside of and spaced from the lower panel with respect to the nozzle centerline;

wherein the nozzle actuation system includes an upper cam fixedly mounted to the upper rotatable shaft, nozzle actuation system further including an extension member extending radially between and connecting the upper cam and the upper panel.

2. The variable area nozzle assembly of claim 1, wherein the nozzle throat cross-sectional area has a rectangular cross-sectional shape.

3. The variable area nozzle assembly of claim 1, wherein the nozzle actuation system includes an actuation linkage, the actuation linkage including a first linkage end and a second linkage end, the first linkage end pivotably mounted to the upper cam and the second linkage end pivotably mounted to the extension member.

4. The variable area nozzle of claim 1, wherein the extension member is curved.

5. The variable area nozzle of claim 1, wherein the nozzle actuation system includes a motor coupled to one of the first lateral end or the second lateral end of the upper rotatable shaft, the motor configured to rotate the upper rotatable shaft.

6. The variable area nozzle of claim 1, wherein the nozzle further includes an upper panel assembly and a lower panel assembly, the upper panel assembly including a first inner panel pivotably mounted to the upper panel at the upper downstream end, the lower panel assembly including a second inner panel pivotably mounted to the lower panel at the lower downstream end.

7. The variable area nozzle of claim 6, wherein the upper panel assembly includes a first outer panel pivotably mounted to the first inner panel and the lower panel assembly includes a second outer panel pivotably mounted to the second inner panel.

8. The variable area nozzle of claim 7, wherein the upper panel assembly includes at least one linkage pivotably connected to the first outer panel and the first inner panel.

9. The variable area nozzle of claim 8, wherein the first inner panel includes a first axial end and a second axial end, and the at least one linkage is positioned axially between the first axial end and the second axial end with respect to the nozzle centerline.

10. The variable area nozzle of claim 7, wherein the first outer panel is positioned proximate the first inner panel at a downstream end of the upper panel assembly and wherein the first outer panel is configured to pivot relative to the first inner panel proximate the downstream end.

11. The variable area nozzle of claim 10, wherein the upper panel assembly includes a seal positioned at the downstream end between the first inner panel and the first outer panel.

12. The variable area nozzle of claim 10, wherein the downstream end of the upper panel assembly defines a portion of the nozzle outlet cross-sectional area.

13. A method for operating a variable area nozzle assembly, the method comprising:

providing a fixed structure surrounding an exhaust duct extending along a nozzle centerline;

pivoting an upper panel and a lower panel of a nozzle with a nozzle actuation system to control a cross-sectional area of a throat-cross-sectional area of the nozzle, the upper panel and the lower panel pivotably mounted to the fixed structure, pivoting the upper panel including rotating an upper shaft connected to the upper panel by an upper cam and pivoting the lower panel including rotating a lower shaft connected to the lower panel by a lower cam, the upper cam fixedly mounted to the upper shaft, the upper cam positioned radially outside of and spaced from the upper panel, the lower cam fixedly mounted to the lower shaft, the lower cam positioned radially outside of and spaced from the lower panel.

14. The method of claim 13, wherein the upper shaft is positioned radially outside of the upper panel with respect to the nozzle centerline and the lower shaft is positioned radially outside of the lower panel with respect to the nozzle centerline.

15. The method of claim 14, an extension member extends radially between and connects the upper cam to the upper panel.

16. The method of claim 15, wherein the nozzle actuation system includes an actuation linkage pivotably mounted to the upper cam and the extension member.

17. The method of claim 13, wherein the upper shaft extends between a first lateral end and a second lateral end, the method further comprising rotating the upper shaft with a motor coupled to one of the first lateral end or the second lateral end.

18. A variable area nozzle assembly for a gas turbine engine, comprises:

a fixed structure surrounding an exhaust duct extending along a nozzle centerline, the fixed structure defining an exhaust duct outlet of the exhaust duct, the fixed structure including an upper side and a lower side opposite the upper side, the fixed structure further including a first lateral side and a second lateral side opposite the first lateral side;

a nozzle disposed about the nozzle centerline, the nozzle including a nozzle throat cross-sectional area and a nozzle outlet cross-sectional area downstream of the nozzle throat cross-sectional area, the nozzle including:

an upper panel pivotably mounted to the fixed structure at the upper side and a lower panel pivotably mounted to the fixed structure at the lower side, the upper panel including an upper downstream end and the lower panel including a lower downstream end; and an upper panel assembly and a lower panel assembly, the upper panel assembly including a first inner panel pivotably mounted to the upper panel at the upper downstream end, the lower panel assembly including a second inner panel pivotably mounted to the lower panel at the lower downstream end, the upper panel assembly and the lower panel assembly defining a portion of the nozzle outlet cross-sectional area; and a nozzle actuation system including an upper rotatable shaft connected to the upper panel and a lower rotatable shaft connected lower panel such that rotation of the upper rotatable shaft and the lower rotatable shaft is configured to control a cross-sectional area of the throat cross-sectional area by pivoting the upper panel and the lower panel, respectively, relative to the fixed structure, the upper rotatable shaft positioned radially outside of and spaced from the upper panel with respect to the nozzle centerline and the lower rotatable shaft positioned radially outside of and spaced from the lower panel with respect to the nozzle centerline.

* * * * *